United States Patent
Yamakawa et al.

(10) Patent No.: US 6,675,644 B2
(45) Date of Patent: *Jan. 13, 2004

(54) THERMO-SENSITIVE FLOW RATE SENSOR

(75) Inventors: Tomoya Yamakawa, Tokyo (JP); Masahiro Kawai, Tokyo (JP); Yutaka Ohashi, Tokyo (JP); Yuichi Sakai, Tokyo (JP); Akira Yamashita, Tokyo (JP); Kazuhiko Tsutsumi, Tokyo (JP)

(73) Assignee: Mitsubishi Denki Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/289,393

(22) Filed: Apr. 12, 1999

(65) Prior Publication Data
US 2002/0011104 A1 Jan. 31, 2002

(30) Foreign Application Priority Data
Oct. 28, 1998 (JP) .......................... 10-307138

(51) Int. Cl.$^7$ .............................. G01F 1/68
(52) U.S. Cl. ................................. 73/204.26
(58) Field of Search ............... 73/204.26, 204.24, 73/204.25

(56) References Cited

U.S. PATENT DOCUMENTS

| 5,291,781 A | * | 3/1994 | Nagata et al. | 73/204.26 |
|---|---|---|---|---|
| 5,406,841 A | * | 4/1995 | Kimura | 73/204.26 |
| 5,717,136 A | * | 2/1998 | Aoi et al. | 73/204.26 |
| 5,804,720 A | * | 9/1998 | Morimasa et al. | 73/204.26 |
| 5,852,239 A | * | 12/1998 | Sato et al. | 73/204.26 |
| 5,965,811 A | * | 10/1999 | Kawai et al. | 73/204.26 |

FOREIGN PATENT DOCUMENTS

| JP | 64-40024 | 3/1989 |
|---|---|---|
| JP | 03-255918 | 11/1991 |
| JP | 4-230808 | 8/1992 |
| JP | 5-264566 | 10/1993 |
| JP | 07-055523 | 3/1995 |
| JP | 09-318412 | 12/1997 |
| JP | 10-197305 | 7/1998 |

* cited by examiner

Primary Examiner—Harshad Patel
(74) Attorney, Agent, or Firm—Sughrue Mion, PLLC

(57) ABSTRACT

A thermo-sensitive flow rate sensor that comprises a plate-like substrate, a part of which is removed so that a space is provided therein, a diaphragm portion formed like a thin layer above the space in such a manner as to be integral with the plate-like substrate, and a heating element constituted by a thermo-sensitive electrically resistant film formed on the diaphragm. Plural holes penetrating the diaphragm portion are bored in an outer peripheral portion of the heating element. Each of the plurality of holes is shaped in such a way as to have obtuse corner portions or to have substantially no corner portions. The thermo-sensitive flow rate sensor measures the flow rate of a fluid, which is to be measured, according to an amount of heat transferred to the fluid from a part heated by energizing the heating element.

5 Claims, 9 Drawing Sheets

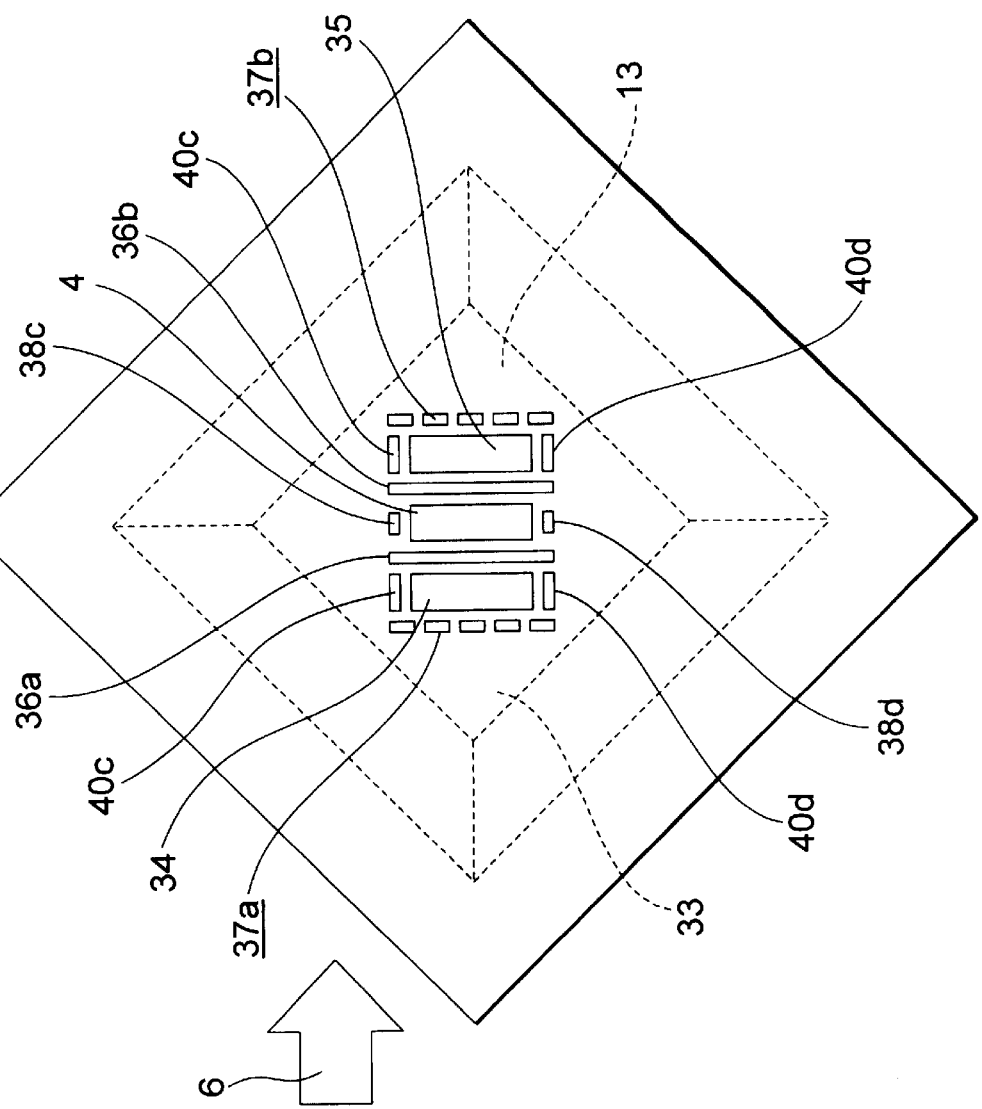

THERMO-SENSITIVE FLOW RATE SENSOR

BACKGROUND OF THE INVENTION

1. Field of the Invention

This invention relates to a thermo-sensitive flow rate sensor employing a flow rate detecting device which has a heating element and which is used for measuring flow velocity or flow rate of a fluid on the basis of a heat transfer phenomenon where a heat is transferred from the heating element or from a part heated by the heating element to the fluid. This invention is applied to, for example, a thermo-sensitive flow rate sensor for use in measuring an intake air amount in an internal combustion engine.

2. Description of the Related Art

FIGS. 13 and 14 are a side sectional view and a plan view of a conventional flow rate detecting device described in, for instance, Japanese Unexamined Patent Publication No. 4-230808 Official Gazette, respectively.

In the device shown in FIGS. 13 and 14, a plate-like substrate 1 is constituted by a silicon semiconductor. A thin-layer-like diaphragm portion 13 is integrally formed in a central portion of the top surface of the plate-like substrate 1. This diaphragm portion 13 is formed as follows. For example, anisotropic etching is performed on the plate-like substrate 1 from the back-surface side thereof. Thus, a part of the plate-like substrate 1 is removed so that a cavity 33, which does not reach the top surface of the plate-like substrate 1 and which has a trapezoidal section, is formed in a central portion of the back surface of the plate-like substrate 1.

Further, a thin film heating element 4 is formed on the central portion of the top surface of the diaphragm portion 13, which is constituted by forming a part of the plate-like substrate 1 like a thin layer. Moreover, thin-film temperature measuring elements 34 and 35 are respectively placed along both sides of the heating element 4 in such a manner as to be at a predetermined distance therefrom and to be symmetrical with respect thereto. Furthermore, linear holes 36a and 36b penetrating the diaphragm portion 13 are formed between the heating element 4 and the temperature measuring elements 34 and 35 in such a way as to extend along the longitudinal direction of the heating element 4. Further, a plurality of holes 37a and 37b penetrating the diaphragm portion 13 are formed outside the temperature measuring elements 34 and 35 in such a manner as to extend along the longitudinal directions thereof. Similarly, holes 38c and 38d penetrating the diaphragm portion 13 are bored therein at both sides in the longitudinal direction of the heating element 4. Moreover, holes 40c and 40d penetrating the diaphragm portion 13 are bored at both sides in the longitudinal directions of the temperature measuring heating elements 34 and 35. These holes are formed by techniques, such as photolithography, wet etching and dry etching, in such a way as to have rectangular sections.

When an amount of electric current fed to the heating element 4 is controlled by the conventional flow rate detecting device in a manner such that the temperature of the heating element 4 will rise to a predetermined value which is higher than the temperature of the fluid by a predetermined number of degrees, the temperature measuring elements 34 and 35 have the same temperature if the fluid does not move (namely, the flow velocity thereof=0).

When the fluid is caused to move in the direction of an arrow 6, the temperature of the temperature measuring element 34 placed upstream of the temperature measuring element 35 falls below the temperature of the element 34 in the case that the flow velocity =0. As the flow velocity increases, the temperature of the element 34 falls. On the other hand, the temperature of the temperature measuring element 35 does not fall to that of the upstream temperature measuring element 34 at the same flow rate. The flow rate of the fluid, therefore, can be measured by obtaining a quantity corresponding to the difference in temperature between the temperature measuring elements 34 and 35 by means of the device having a Wheatstone bridge circuit into which the temperature measuring elements 34 and 35 are incorporated.

The Japanese Unexamined Patent Publication No. 4-230808 Official Gazette describes that the conventional flow rate detecting device obtains the advantages that variation in output thereof due to deposition of dust thereto is reduced by boring holes therein to thereby lower the flow rates of heat flows flowing from the heating element 4 to the temperature measuring devices 34 and 35 and to thus lower the temperatures of the elements 34 and 35, and that the sensitivity thereof is enhanced because the flow rate of flow of heat conducted from the heating element 4 to the plate-like substrate 1 can be decreased.

Meanwhile, when the heating element 4 is energized and caused to generate heat, when the flow velocity of the fluid increases, when a pressure is exerted upon the flow rate detecting device, or when the flow rate detecting device is subjected to large vibrations, stress is produced in the diaphragm portion 13.

In the conventional flow rate detecting device, all of the holes 36a, 36b, 37a, 37b, 38c, 38d, 40c and 40d are formed in such a way as to have rectangular sections. Thus, the conventional flow rate detecting device has the problem that the aforementioned stress is concentrated on the corner portions of the holes, so that the diaphragm portion 13 is easy to break at these corner portions. Especially, in the case that a plurality of holes are provided in the diaphragm portion 13 so as to ensure heat insulation, the number of fragile parts increases.

Further, in the conventional flow rate detecting device, the holes are bored in the vicinity and upstream of the heating element 4 and the temperature measuring elements 34 and 35. Thus, when this device is used over a long period, dust contained in a fluid to be measured accumulates on the downstream inner surface of the holes. Consequently, the conventional flow rate detecting device has the additional problem that the condition of the flow of the fluid flowing on the surface of the diaphragm 13 changes and the detecting characteristics of the device vary.

For instance, when this conventional flow rate detecting device is employed in an intake air flow rate sensor for use in controlling a fuel for an automotive engine, the following trouble occurs.

The automotive engine causes vibrations, whose acceleration ranges from 40 Gal to 50 Gal. Further, the flow velocity of intake air sometimes reaches 200 m/s or more. Moreover, when the engine backfires, a pressure being close to 2 atm may be applied to the device. In the case that the conventional flow rate detecting device is subjected to such mechanical stress, this device easily breaks from the hole portions formed therein.

On the other hand, the intake air of the internal combustion engine flows through an air cleaner element disposed upstream of the intake air flow rate sensor. Dust particles of a few microns in size pass through the air cleaner element and then deposit to the downstream inner surface of each of the holes. This changes the flow of air flowing downstream from the holes. Consequently, the flow rate detecting performance of the device is deteriorated.

SUMMARY OF THE INVENTION

This invention is accomplished to solve the aforementioned problems of the conventional device. Accordingly, an object of the present invention is to provide a thermo-sensitive flow rate sensor with high sensitivity and reliability.

To achieve the foregoing object, according to an aspect of the present invention, there is provided a thermo-sensitive flow rate sensor having a flow rate detecting device that comprises a plate-like substrate, a part of which is removed so that a space is provided therein, a diaphragm portion formed like a thin layer above the aforesaid space in such a manner as to be integral with the aforesaid plate-like substrate, and a heating element constituted by a thermo-sensitive electrically resistant film formed on the aforesaid diaphragm portion, the aforesaid thermo-sensitive flow rate sensor being adapted to measure the flow rate of a fluid, which is to be measured, according to an amount of heat transferred to the aforesaid fluid from a part heated by energizing the aforesaid heating element. wherein a plurality of holes are provided in an outer peripheral portion of the heating element so as to penetrate the diaphragm portion, the holes being shaped in such a way as to have obtuse corner portions or to have substantially no corner portions.

According to another aspect of the present invention, there is provided a thermo-sensitive flow rate sensor having a flow rate detecting device that comprises a plate-like substrate, a part of which is removed so that a space is provided therein, a diaphragm portion formed like a thin layer above the aforesaid space in such a manner as to be integral with the aforesaid plate-like substrate, and a heating element constituted by a thermo-sensitive electrically resistant film formed on the aforesaid diaphragm portion, the aforesaid thermo-sensitive flow rate sensor being adapted to measure the flow rate of a fluid, which is to be measured, according to an amount of heat transferred to the aforesaid fluid from a part heated by energizing the aforesaid heating element, wherein a plurality of holes are provided in an outer peripheral portion of the heating element which is other than a part located upstream of the heating element so as to penetrate the diaphragm portion.

According to still another aspect of the present invention, there is provided a thermo-sensitive flow rate sensor having a flow rate detecting device that comprises a plate-like substrate, a part of which is removed so that a space is provided therein, a diaphragm portion formed like a thin layer above the aforesaid space in such a manner as to be integral with the aforesaid plate-like substrate, and a heating element constituted by a thermo-sensitive electrically resistant film formed on the aforesaid diaphragm portion, the aforesaid thermo-sensitive flow rate sensor being adapted to measure the flow rate of a fluid, which is to be measured, according to an amount of heat transferred to the aforesaid fluid from a part heated by energizing the aforesaid heating element, wherein a plurality of holes are provided upstream and downstream of the heating element and along the heating element so as to penetrate the diaphragm portion, the holes provided upstream of the heating element being spaced further apart from the heating element than the holes provided downstream of the heating element.

BRIEF DESCRIPTION OF THE DRAWINGS

Other features, objects and advantages of the present invention will become apparent from the following description of preferred embodiments with reference to the drawings in which like reference characters designate like or corresponding parts throughout several views, and in which:

FIG. 14 is a plan view of the conventional flow rate detecting device.

DETAILED DESCRIPTION OF THE PREFERRED EMBODIMENTS

Hereinafter, the preferred embodiments of the present invention will be described in detail by referring to the accompanying drawings.

First Embodiment

Figure 1:
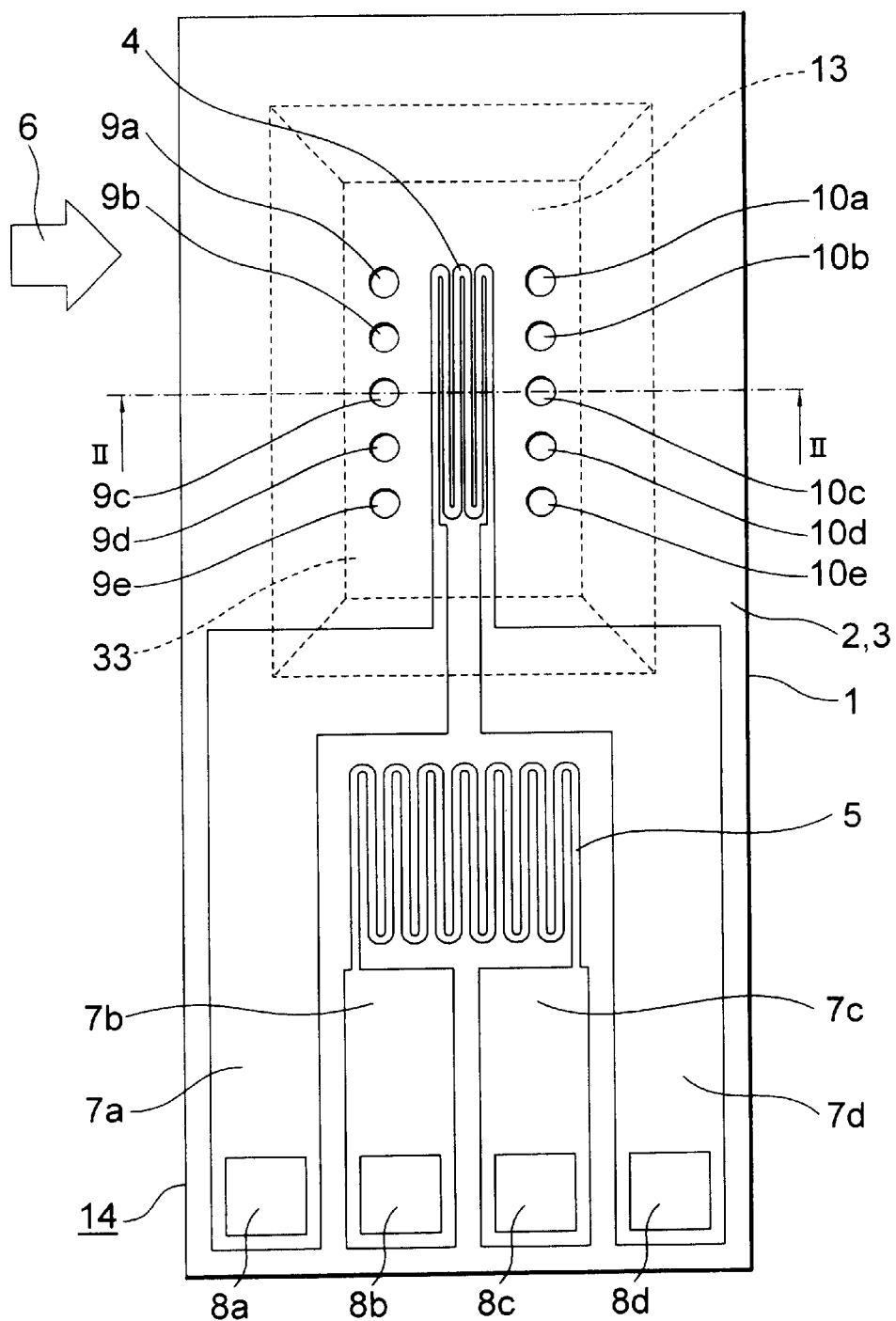
FIG. 1 is a front view of a flow rate detecting device applied to a flow rate sensor according to a first embodiment of the present invention.
Figure 2:
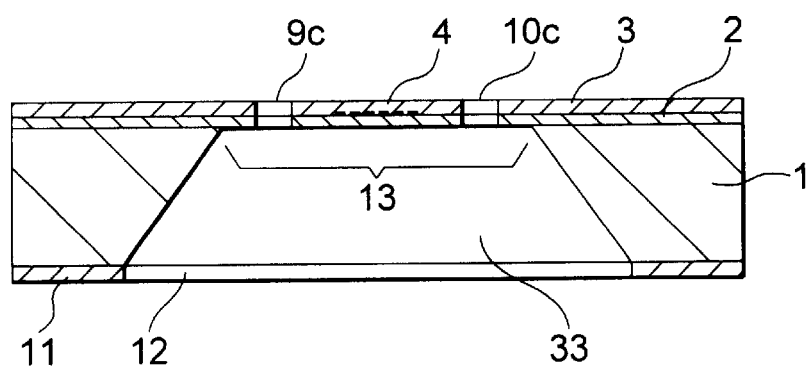
FIG. 2 is a sectional view taken in the direction of arrows on line II—II of FIG. 1.

FIG. 1 is a front view of a flow rate detecting device applied to a flow rate sensor according to the first embodiment of the present invention. FIG. 2 is a sectional view taken in the direction of arrows on line II—II of FIG. 1. Incidentally, for easily seeing the configuration of the device, FIGS. 1 and 2 illustrate the device by modifying an actual ratio among the dimensions of the device. It is the same with the drawings that will be referred to later.

In the device shown in FIGS. 1 and 2, a plate-like substrate 1 is made of silicon. An insulative supporting film 2 made of silicon nitride is formed on the entire surface of the plate-like substrate 1. A heating element 4, a temperature measuring element 5 and lead patterns 7a to 7d, each of which is constituted by a thermo-sensitive electrically resistant film made of platinum, are formed on the supporting film 2. Moreover, an insulative protective coat 3 made of silicon nitride is formed on the supporting film 2 in such a manner as to cover the heating element 4, the temperature measuring element 5 and the lead patterns 7a to 7d. Electrodes 8a to 8d are formed by removing the protective coat portion 3 formed on each of the end portions of the lead patterns 7a to 7d to thereby expose the lead patterns. Further, the electrodes 8a to 8d are electrically connected to an external circuit by a method, such as a wire bonding. Thus, the heating element 4 and the temperature measuring element 5 are electrically connected to the external circuit through the lead patterns 7a to 7d and the electrodes 8a to 8d.

Incidentally, reference numeral 6 designates the direction of flow of a fluid to be measured. Further, the thermosensitive electrically resistant film is an electrically resistant film made of a material having temperature dependent resistance whose electric resistance changes with changes in temperature.

Moreover, a part of the plate-like substrate 1, which has a trapezoidal cross section and extends from the back surface side to the supporting film 2, is removed therefrom. Thus, a cavity 33 serving as a space is formed therein. A thin-layer-like diaphragm portion 13 containing the entire outer perimeter of a part of the heating element 4 sandwiched between the supporting film 2 and the protective coat 3 to be supported by the plate-like substrate 1 is formed in such a way as to be integral with the substrate 1. Further, the temperature measuring element 5 is spaced apart from the diaphragm portion 13 and is placed on the plate-like substrate 1. Furthermore, two lines of circular holes 9a to 9e and 10a to 10e penetrating the supporting film 2 and the protective coat 3 of the diaphragm portion 13 are provided along the heating element 4 upstream and downstream therefrom, respectively.

When the flow rate detecting element 14 configured as described above is manufactured, a 1-μm-thick film made of silicon nitrate is first formed on the entire surface of a 0.4-mm-thick plate-like substrate 1 by using a method, such as sputtering or CVD. Thus, the supporting film 2 is formed on the plate-like substrate 1. Subsequently, a 0.2-μm-thick platinum film is formed on the entire surface of the plate-like substrate 1, on which the supporting film 1 is formed, by using a vaporization or sputtering method. Then, patterning is performed on the platinum film by employing a photolithographic method or a wet (or dry) etching method. Thus, the heating element 4, the temperature measuring element 5 and the lead patterns 7a to 7d are formed. Moreover, a protective coat 3 is formed by depositing a 1-μm-thick film made of silicon nitrate by using the sputtering or CVD method. Thereafter, the protective coat 3 and the supporting film 2 are removed by using the photolithographic method or the wet (or dry) etching method. Thus, two lines of 100-μm-diameter holes 9a to 9e and 10a to 10e penetrating the supporting film 2 and the protective coat 3 of the diaphragm portion 13 are provided upstream and downstream of the heating element 4, respectively. Furthermore, parts of the protective coat 3, which are formed on each of the end portions of the lead patterns 7a to 7d, are removed by the photolithographic method or the wet (or dry) etching method. Thus, the electrodes 8a to 8d are formed.

Subsequently, a back surface protecting coat 11 is formed by depositing a 1-μm-thick film made of silicon nitrate on the entire back surface of the plate-like substrate 1 by using the sputtering or CVD method. Then, the back surface protecting coat 11 is removed by using the photolithographic method. Consequently, an etching hole 12 is formed.

Thereafter, a part of the plate-like substrate 1 is removed by performing, for example, alkali etching thereon so that a resultant space extends from the back surface side thereof to the supporting film 2. Thus, the diaphragm portion 13 is formed. At that time, the holes 9a to 9e and 10a to 10e are bored, so that the top-surface-side space and the back-surface-side space of the plate-like substrate 1 communicate with each other.

The area of a cross section of the diaphragm portion 13 is 0.9 mm×1.5 mm. A heating portion of the heating element 4 is formed in a central portion of the diaphragm portion 13 so that the are of a cross section thereof is 0.3 mm×1 mm.

In this flow rate detecting device 14, the cavity 33 is formed in such a way as to penetrate the plate-like substrate 1. Therefore, as compared with the conventional device in which the cavity is formed so that the top-surface-side portion of the plate-like substrate 1 is left as a thin layer, the diaphragm portion of this flow rate detecting device 14 is shaped into a thinner layer. Heat generated by the heating element 4 is effectively restrained from being conducted to the plate-like substrate 1.

Further, two lines of the holes 9a to 9d and 10a to 10e, each of which penetrates the diaphragm portion 13, are provided on both sides of the heating element 4 along the longitudinal direction thereof. Thus, the heat resistance of the diaphragm portion 13 increases. Consequently, heat generated by the heating element 4 is effectively restrained from being conducted to the plate-like substrate.

Additionally, the holes 9a to 9e and 10a to 10e are shaped into circular holes, each of which has no corner portion. Therefore, when the heating element 4 is energized and generates heat, or when an external force is applied to the flow rate detecting device 14, stress is not concentrated on a part of the wall of each of the holes. Consequently, the diaphragm portion 13 is prevented from being damaged owing to the concentration of stress.

Next, the configuration of a flow rate sensor employing the flow rate detecting device constituted in the aforementioned manner will be described by referring to FIGS. 3 and 4.

Figure 3:
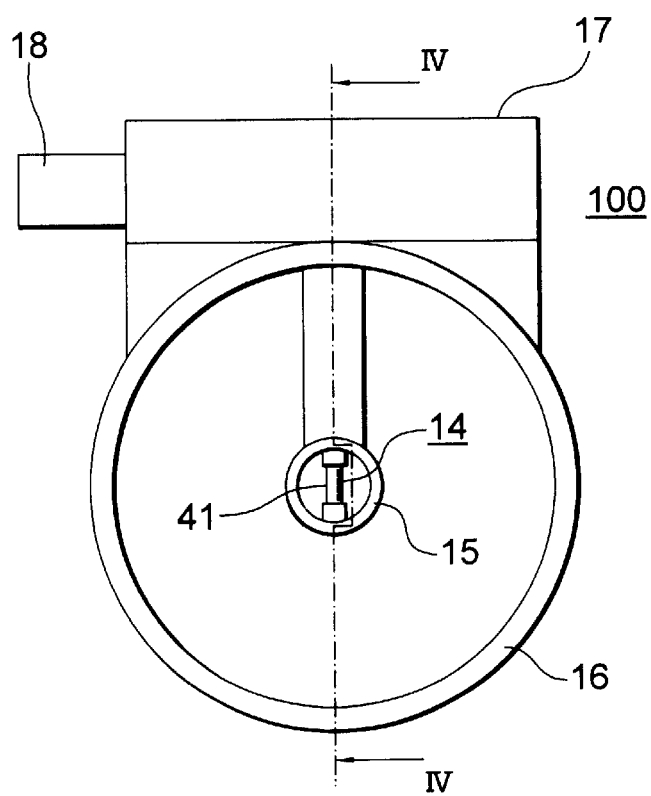
FIG. 3 is a front view showing the configuration of the flow rate sensor according to the first embodiment of the present invention.
Figure 4:
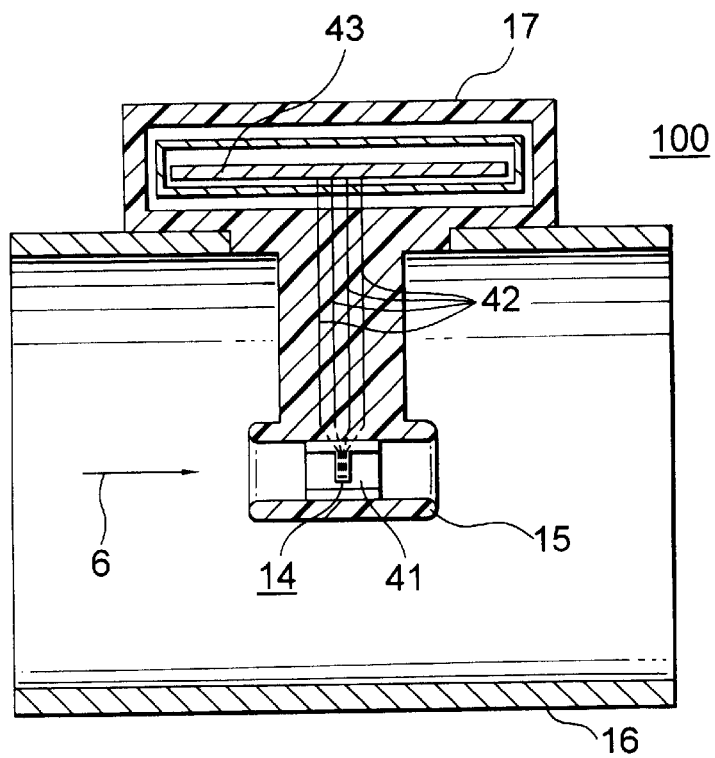
FIG. 4 is a sectional view taken in the direction of arrows on line IV—IV of FIG. 3.

As shown in FIGS. 3 and 4, a flow rate sensor 100 comprises a main passage 16 serving as a passage for a fluid to be measured, a detecting pipe 15 coaxially disposed in the main passage 16, a case 17 containing a control circuit board 43, a connector 18 for supplying power to the flow rate sensor 100 and for taking out an output of the sensor 100, and the flow rate detecting device 14 disposed in the detecting pipe 15. Further, the electrodes 8a to 8d of the flow rate detecting device 14 are electrically connected to the control circuit board 43 by lead wires 42.

The flow rate detecting device 14 is attached to the surface of a holder 41 and disposed in the detecting pipe 15 so that the top surface of the plate-like substrate 1 is parallel to the direction of flow of the fluid to be measured and that the top surface of the plate-like substrate 1 is subjected to the fluid. Further, the flow rate detecting device 14 is disposed in the detecting pipe 15 so that the holes 9a to 9e are provided upstream of the heating element 4 and that the holes 10a to 10e are provided downstream thereof.

Figure 5:
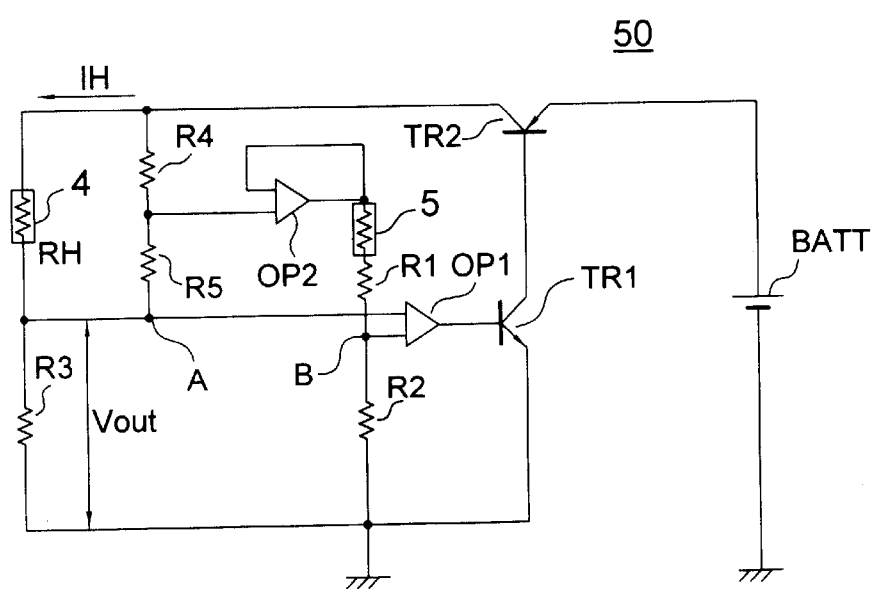
FIG. 5 is a diagram showing a control circuit of the flow rate sensor according to the first embodiment of the present invention.

A control circuit 50 of this flow rate sensor 100 is a bridge circuit including the heating element 4 and the temperature measuring element 5, as shown in FIG. 5. Incidentally, resistors R1 to R5 have fixed resistance values. Reference characters OP1 and OP2 denote operational amplifiers; TR1 and TR2 denote transistors; and BATT denotes a power supply. Incidentally, the components other than the heating element 4 and the temperature measuring element 5 are mounted on the control circuit board 43.

Hereunder, a method of detecting the flow rate of the fluid by this flow rate sensor 100 will be described.

The temperature measuring element 5 is spaced apart from the diaphragm portion 13 and mounted on the plate-like substrate 1. Thus, heat generated by the heating element 4 is not transferred to the temperature measuring element 5. Moreover, the temperature measuring element 5 is not positioned downstream from the heating element 4. Thus, the temperature measuring element 5 is not subjected to the fluid heated by the heating element 4. Consequently, a temperature detected by the temperature measuring element 5 is nearly equal to the temperature of the fluid flowing into the detecting pipe 15.

Further, the heating element 4 is controlled by the control circuit 50 illustrated in FIG. 5 in such a manner as to have a resistance value by which the average temperature of the heating element 4 is higher than the temperature of the temperature measuring element 5 by a specific number of degree. Namely, the control circuit 50 acts so that the electric potential at a point A shown in FIG. 5 is approximately equal to the potential at a point B shown therein. Moreover, the control circuit 50 controls a heating current IH for the heating element 4. Furthermore, when the flow velocity of the fluid increases, an amount of heat transferred from the heating element 4 to the fluid increases. As a result, the temperature of the heating element 4 falls. Then, the heating current IH is increased, so that the average temperature of the heating element 4 is maintained at a predetermined value. Consequently, the heating element 4 is maintained in such a way as to have a temperature that is higher than the temperature of the temperature measuring element 5 (namely, the temperature of the fluid to be measured) by a certain number of degrees.

This heating current IH is detected in terms of a voltage Vout developed across the resistor R3. The flow velocity of the fluid or the flow rate of a fluid flowing through a passage having a predetermined sectional area is measured according to a signal representing the detected current or voltage.

Let RH, TH, TA and Q designate the resistance value of the heating element 4, the average temperature thereof, the temperature of the fluid to be measured and the flow rate of the fluid flowing through a passage having a predetermined sectional area. Thus, the following equation (1) holds therefor:

$$IH^2 \times RH = (a + b \times Q^n) \times (TH - TA) \quad (1)$$

where a, b and n are constants determined by the shape of the flow rate detecting device. The constant a is a factor corresponding to the amount of heat, which does not depend upon the flow rate of the fluid. The major part of this factor is a heat conduction loss of heat conducted from the heating element 4 to the plate-like substrate 1. On the other hand, the constant b is a factor corresponding to forced-convection heat transfer. Further, the constant n has a value determined by the condition of flow of the fluid in the proximity of the heating element 4. This value is 0.5 or so.

As is apparent from the equation (1), the amount of heat corresponding to the factor a does not contribute to the detected flow rate. Therefore, the sensitivity of the flow rate sensor 100 is enhanced by reducing the heat conduction loss of heat conducted from the heating element 4 to the plate-like element 4.

Moreover, the time period between a moment, at which the flow rate sensor 100 is activated by supplying electric power thereto, and another moment, at which the sensor 100 outputs an accurate flow rate signal, decreases as the heat flow flowing from the heating element 4 to the plate-like substrate 1 having high heat capacity is reduced.

In the case of the conventional flow rate sensor adapted to measure a flow velocity and a flow rate according to a signal representing the difference in temperature between the temperature measuring elements respectively placed upstream and downstream of the heating element, the influence of the heat flow flowing from the heating element to the plate-like substrate is canceled by detecting the difference in temperature between the two temperature measuring elements. Thus, the sensitivity of the conventional flow rate sensor is restrained from being deteriorated. Furthermore, the time between the activation of the sensor and the output of the accurate flow rate signal therefrom is shortened.

However, in the case of the flow rate sensor 100 adapted to measure the flow velocity and the flow rate of the fluid by controlling the heating current for the heating element 4 so that the temperature of the heating element 4 is higher than the temperature of the temperature measuring element 5 by a certain number of degrees and by detecting this heating current, the difference in temperature between the temperature measuring elements placed at both sides of the heating element 4 is not detected. Thus, the sensitivity of the flow rate sensor 100 is degraded. Further, the time between the activation of the sensor and the output of the accurate flow rate signal therefrom is long. To solve these problems, this flow rate sensor 100 is required to decrease the loss of heat conducted from the heating element 4 to the plate-like substrate 1 and to reduce heat flow flowing from the heating element 4 to the plate-like substrate 1 having high heat capacity, as described above. Therefore, in the case of this flow rate sensor 100, the necessity for heat insulation by the holes provided in the diaphragm portion 13 is enhanced, in comparison with the case of the conventional flow rate sensor. Namely, in the case of the conventional flow rate sensor, it is sufficient to provide a small number of small holes in the diaphragm portion. Conversely, the flow rate sensor 100 requires having large holes or having a large number of holes in the diaphragm portion 13. This increases a fear of breakage of the sensor from the hole portions. Consequently, this flow rate sensor 100 requires having means for preventing an occurrence of breakage thereof from the hole portions.

In this first embodiment, two lines of holes 9a to 9e and 10a to 10e are provided at both sides of the heating element 4, respectively. Thus, the heat resistance of a heat conduction path from the heating element 4 to the plate-like substrate 1 increases. This ensures the heat insulation between the heating element 4 and the plate-like substrate 1. Thus, the heat conduction loss of heat conducted from the heating element 4 to the plate-like substrate 1 decreases. Moreover, the flow rate of heat flow flowing from the heating element 4 to the plate-like substrate 1 decreases. Consequently, the sensitivity of the flow rate sensor 100 is restrained from decreasing. Furthermore, the time between the activation of the sensor and the output of the accurate flow rate signal therefrom is shortened. Thus, the flow rate sensor adapted to measure the flow rate and the flow velocity by detecting the heating current for the heating element is obtained.

Further, in the case of the flow rate sensor of the type that measures the flow rate and the flow velocity by detecting the heating current for the heating element, it is unnecessary to employ a complex structure in which the temperature measuring elements placed upstream and downstream of the heating element, in contrast to the conventional flow rate sensor. The flow rate sensor according to this embodiment is realized only by providing the heating element 4 in the diaphragm portion 13. Moreover, the constitution of the flow rate detecting device is simplified. The cost of the flow rate sensor is reduced.

Additionally, the holes 9a to 9e and 10a to 10e are shaped into circular ones. Thus, even when the heating element 4 is energized and generates heat, or when an external force is exerted on the diaphragm portion 13, the concentration of stress on a part of the wall of each of the holes is difficult to occur. Consequently, the breakage of the diaphragm portion 13 is prevented. Hence, even when used in a severe use environment, for example, in an intake air flow rate sensor of an automotive internal combustion engine, a highly reliable flow rate sensor is obtained.

Incidentally, although the values of the thickness of each of the supporting film 2, the platinum film and the protective coat 3, and the sizes of the heating element 4, the holes 9a to 9e and 10a to 10e and the diaphragm portion 13 have been concretely described in the foregoing description of the first embodiment, these values are merely illustrative. The present invention is not limited to the first embodiment employing these values. It is the same with the other embodiments of the present invention.

Further, although silicon nitrate is employed as the material of the supporting film 2 and the protective coat 3, the materials of the supporting film 2 and the protective coat 3 are not limited thereto. Other insulative materials, for instance, tantalum pentoxide and silicon dioxide may be employed as the materials of the supporting film 2 and the protective coat 3.

Furthermore, although platinum is employed as the material of the heating element 4 and the temperature measuring elements 5, the materials of these elements are not limited thereto. Other thermo-sensitive electrically resistant films, for example, Permalloy, which is an alloy of iron and nickel, employed as the material of these elements.

Second Embodiment

Figure 6:
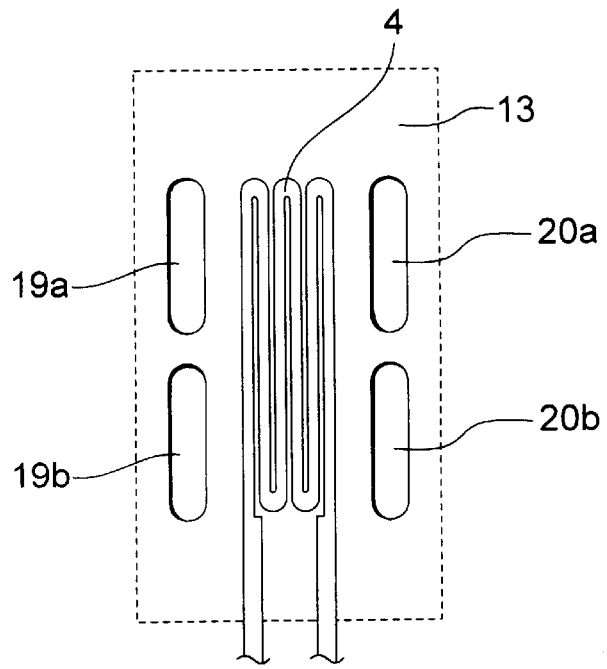
FIG. 6 is a front view of a primary part of a flow rate detecting device applied to a flow rate sensor according to a second embodiment of the present invention.

Although two lines of circular holes 9a to 9e and 10a to 10e are respectively disposed upstream and downstream of the heating element 4 in the aforementioned first embodiment, two groups of elliptical holes (19a and 19b) and (20a and 20b) are disposed upstream and downstream of the heating element 4 in this second embodiment, as shown in FIG. 6. In this embodiment, each of the elliptical holes is 100 μm in width and 400 μm in length. Incidentally, the remaining components of the sensor according to this embodiment are similar to the corresponding components of the sensor according to the first embodiment.

The two groups of the holes (19a and 19b) and (20a and 20b) are respectively provided at both sides of the heating element 4 and therealong even in the second embodiment. Thus, the diaphragm portion 13 has high heat resistance. Consequently, the conduction of heat from the heating element 4 to the plate-like substrate 1 is effectively restrained. Moreover, each of the holes 19a, 19b, 20a and 20b is shaped in such a manner as to have no corner. Thus, even when the heating element 4 is energized and generates heat, or when an external force is exerted on the diaphragm portion 13, the concentration of stress on a part of the wall of each of the holes is difficult to occur. Consequently, the breakage of the diaphragm portion 13 is prevented.

Third Embodiment

Figure 7:
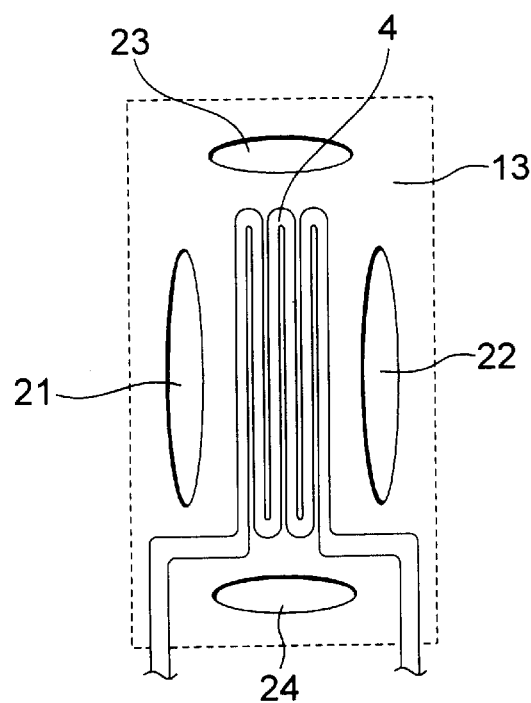
FIG. 7 is a front view of a primary part of a flow rate detecting device applied to a flow rate sensor according to a third embodiment of the present invention.

Although two lines of circular holes 9a to 9e and 10a to 10e are respectively disposed upstream and downstream of the heating element 4 in the aforementioned first embodiment, oval holes 21 and 22 are disposed upstream and downstream of the heating element 4 and oval holes 23 and 24 are provided at both sides of the element 4 in a direction which is perpendicular to the direction of flow of the fluid to be measured in this third embodiment, as shown in FIG. 7. In this embodiment, each of the oval holes 21 and 22 is 100 μm in width and 700 μm in length, and each of the oval holes 23 and 24 is 100 μm in width and 400 μm in length. Incidentally, the remaining components of the sensor according to this embodiment are similar to the corresponding components of the sensor according to the first embodiment.

Even in the case of the third embodiment, each of the holes 21, 22, 23 and 24 is shaped in such a way as to have no corner. Thus, even when the heating element 4 is energized and generates heat, or when an external force is exerted on the diaphragm portion 13, the concentration of stress on a part of the wall of each of the holes is hard to occur. Consequently, the breakage of the diaphragm portion 13 is prevented.

Moreover, in the third embodiment, the holes 21, 22, 23 and 24 are provided at all sides of the heating element 4. The heat resistance of the heat conduction path from the heating element 4 to the plate-like substrate 1 increases still more. Consequently, the heating element 4 is effectively heat-insulated from the plate-like substrate 1.

Fourth Embodiment

Figure 8:
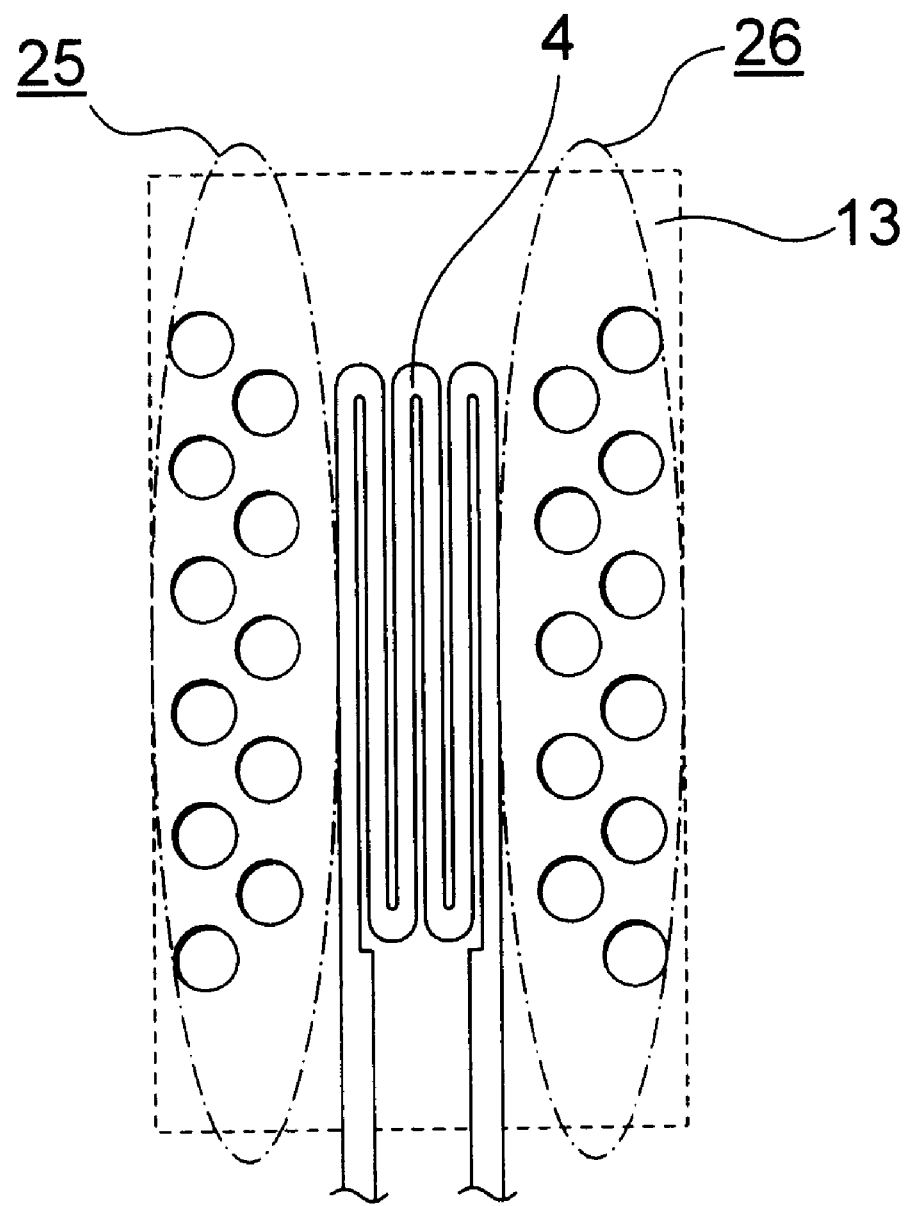
FIG. 8 is a front view of a primary part of a flow rate detecting device applied to a flow rate sensor according to a fourth embodiment of the present invention.

Although two lines of circular holes 9a to 9e and 10a to 10e are respectively disposed upstream and downstream of the heating element 4 in the aforementioned first embodiment, two groups of circular holes 25 and 26 are provided upstream and downstream of the heating element 4 in this fourth embodiment, as shown in FIG. 8. Further, in each of the groups 25 and 26, circular holes, each of which has a diameter of 100 μm, are arranged in a staggered manner. Incidentally, the remaining components of the sensor according to this embodiment are similar to the corresponding components of the sensor according to the first embodiment.

Even in the case of the fourth embodiment, each of the holes of the groups 25 and 26 is shaped in such a way as to have no corner. Thus, even when the heating element 4 is energized and generates heat, or when an external force is exerted on the diaphragm portion 13, the concentration of stress on a part of the wall of each of the holes is difficult to occur. Consequently, the breakage of the diaphragm portion 13 is prevented.

Moreover, in the fourth embodiment, the holes of each of the groups 25 and 26 are provided in a staggered manner. Thus, many holes are arranged in a limited area surrounding the heating element 4 in such a way as to restrain the strength of the diaphragm portion 13 from decreasing. Consequently, the heat resistance of the heat conduction path from the heating element 4 to the plate-like substrate 1 increases still more. Thus, the heating element 4 is effectively heat-insulated from the plate-like substrate 1.

Fifth Embodiment

Figure 9:
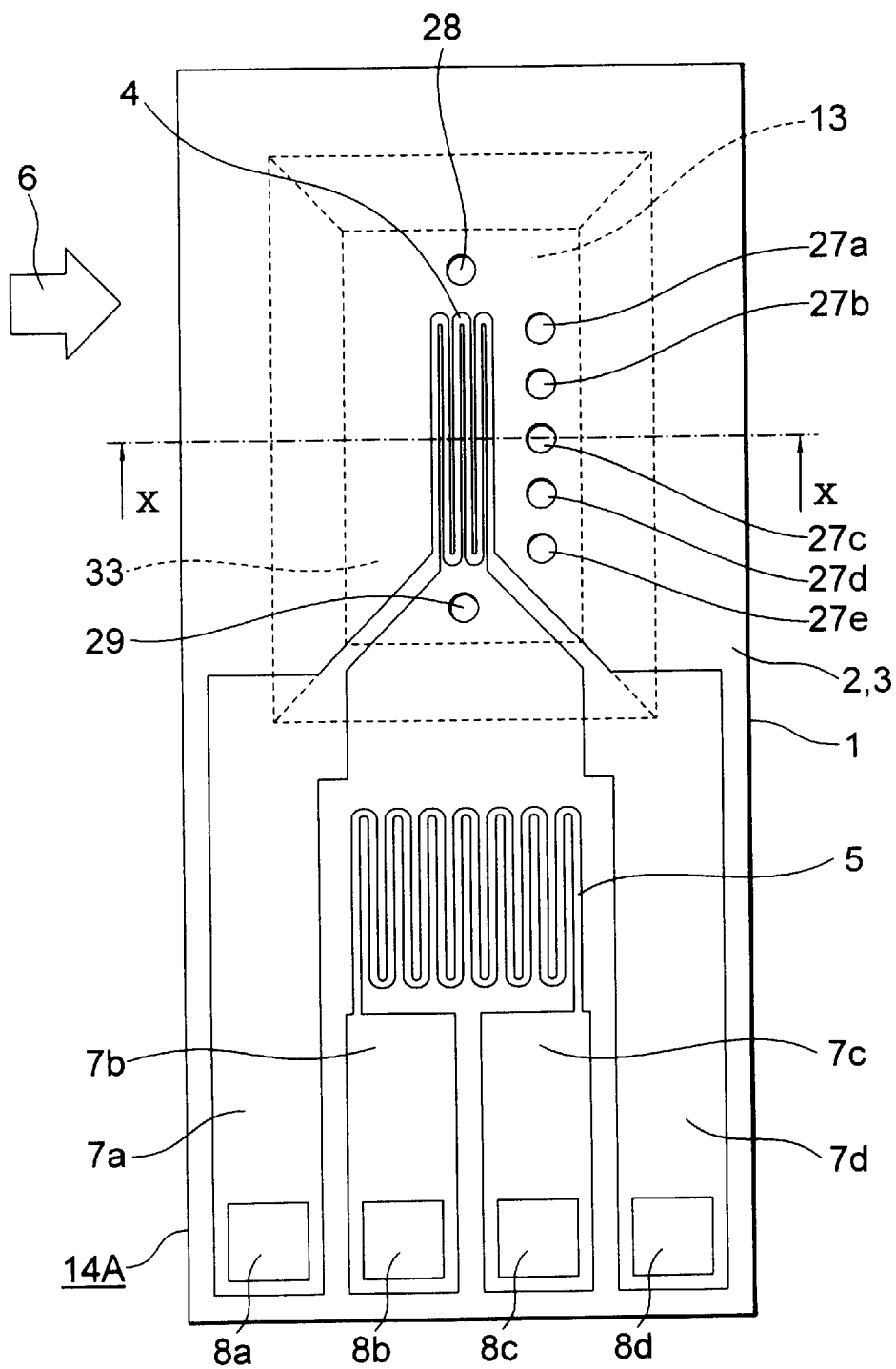
FIG. 9 is a front view of a primary part of a flow rate detecting device applied to a flow rate sensor according to a fifth embodiment of the present invention.
Figure 10:
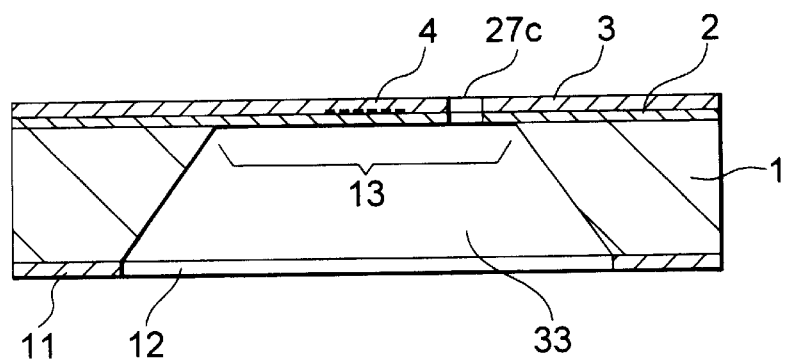
FIG. 10 is a sectional view taken in the direction of arrows on line X—X of FIG. 9.

FIG. 9 is a front view of a flow rate detecting device applied to a flow rate sensor according to the fifth embodiment of the present invention. FIG. 10 is a sectional view taken in the direction of arrows on line X—X of FIG. 9. In the device illustrated in FIGS. 9 and 10, circular holes 27a to 27e, each of which has a diameter of 100 μm, are arranged in a line downstream of the heating element 4. Moreover, circular holes 28 and 29, each of which has a diameter of 100 µm, are arranged at both opposite sides of the heating element 4 in a direction which is perpendicular to the direction of flow of the fluid to be measured.

Incidentally, this fifth embodiment is configured similarly to the aforementioned first embodiment, except that holes 9a to 9e are not provided upstream of the heating element 4 and that the holes 28 and 29 are provided at both opposite sides of the heating element 4 in a direction which is perpendicular to the direction of flow of the fluid.

In the case of the flow rate sensor employing the flow rate detecting device 14A constructed as described above, no holes are provided upstream of the heating element 4. Thus, even if dust contained in the fluid is accumulated on the end portions of the walls of the holes, the condition of flow of the fluid at a part, at which the flow rate of the fluid is measured, of the heating element 4 does not change. Therefore, even if the flow rate sensor using this flow rate detecting device 14A is applied to an intake air flow rate sensor of an automotive internal combustion engine, the flow rate detecting characteristics of the flow rate sensor does not vary. Consequently, the detecting characteristics of the flow rate sensor are stably maintained over a long time period.

Furthermore, the holes 27a to 27e are arranged in a line downstream of the heating element 4 in this fifth embodiment. Thus, the heat flow flowing downstream of the heating element 4 is reduced. Consequently, the sensitivity of the sensor is prevented from being degraded.

Additionally, the holes are shaped into circular ones. Thus, stress is not concentrated on a part of the wall of each of the holes. Consequently, the breakage of the diaphragm portion 13 is prevented.

Sixth Embodiment

Figure 11:
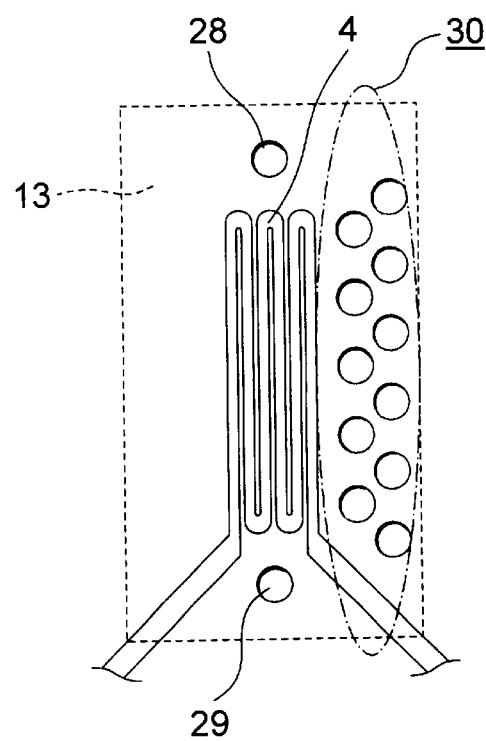
FIG. 11 is a front view of a primary part of a flow rate detecting device applied to a flow rate sensor according to a sixth embodiment of the present invention.

Although the circular holes 27a to 27e are provided in a line downstream of the heating element 4 in the aforementioned fifth embodiment, a group of circular holes 30 are provided downstream of the heating element 4 in this sixth embodiment, as shown in FIG. 11. Further, in the group 30, circular holes, each of which has a diameter of 100 µm, are arranged in a staggered manner. Incidentally, the remaining components of the sensor according to this embodiment are similar to the corresponding components of the sensor according to the fifth embodiment.

Even in the case of this sixth embodiment, the holes 28 and 29 and the group of holes 30 are not provided upstream of the heating element 4. Thus, even if dust contained in the fluid is accumulated on the end portions of the walls of the holes, the condition of flow of the fluid at a part, at which the flow rate of the fluid is measured, of the heating element 4 does not change. Consequently, the detecting characteristics of the flow rate sensor are stably maintained over a long time period.

Further, in this sixth embodiment, the holes of the group 30 are provided in a staggered manner. Thus, many holes are arranged in a upstream limited area of the heating element 4 in such a way as to restrain the strength of the diaphragm portion 13 from decreasing and the heat flow flowing downstream of the heating element 4 is reduced still more. Consequently, the detecting sensitivity of the sensor is prevented from being degraded.

Additionally, the holes are shaped into circular ones. Thus, stress is not concentrated on a part of the wall of each of the holes. Consequently, the breakage of the diaphragm portion 13 is prevented.

Seventh Embodiment

Figure 12:
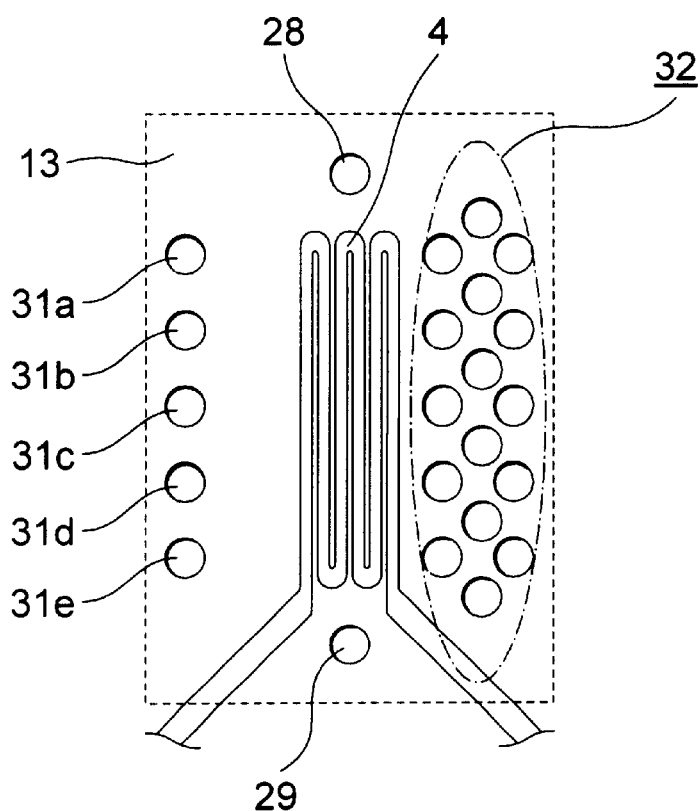
FIG. 12 is a front view of a primary part of a flow rate detecting device applied to a flow rate sensor according to a seventh embodiment of the present invention.
Figure 13:
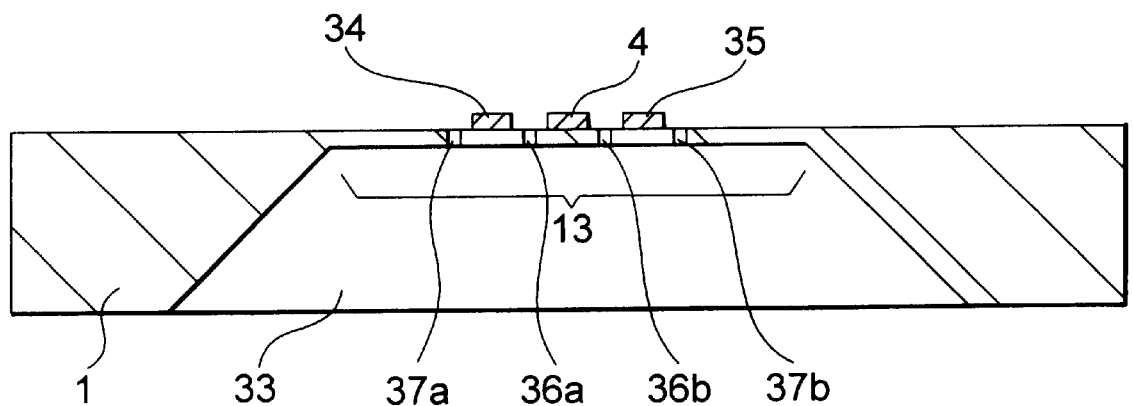
FIG. 13 is a sectional side view of the conventional flow rate detecting device.

In the aforementioned fifth embodiment, the circular holes 27a to 27e are provided in a line downstream of the heating element 4 and the circular holes 28 and 29 are arranged at both opposite sides of the heating element 4 in a direction which is perpendicular to the direction of flow of the fluid to be measured. In contrast to this, as shown in FIG. 12, in this seventh embodiment, a group of circular holes 32, which are 100 µm in diameter and are arranged in a staggered manner, are provided downstream of the heating element. Moreover, 100-µm-diameter circular holes 28 and 29 are provided at both sides of the heating element 4 in a direction which is perpendicular to the direction of flow of the fluid to be measured. Furthermore, 100-µm-diameter circular holes 31a to 31e are arranged in a line upstream of the heating element 4. Additionally, the distance between the heating element 4 and each of the holes 28, 29 and 31a to 31e is set in such a way as to be longer than the distance between the heating element 4 and the group of holes 32. Incidentally, the remaining components of the sensor according to this embodiment are similar to the corresponding components of the sensor according to the fifth embodiment.

Even in the case of this seventh embodiment, the holes 31a to 31e are provided upstream of the heating element 4 in such a manner as to be spaced more apart from the heating element 4, in comparison with the group of holes 32. Thus, even if dust contained in the fluid is accumulated on the end portions of the walls of the holes 31a to 31e, change in the condition of flow of the fluid at a part, at which the flow rate of the fluid is measured, of the heating element 4 is very largely suppressed. Consequently, the flow rate detecting characteristics of the flow rate sensor are stably maintained over a long time period.

Further, in this seventh embodiment, the holes 28, 29 and 31a to 31e and the group of holes 32 are provided at all sides of the heating element 4. The heat resistance of the heat conduction path from the heating element 4 to the plate-like substrate 1 increases still more. Consequently, the heating element 4 is effectively heat-insulated from the plate-like substrate 1.

Moreover, the holes of the group 32 are provided in a staggered manner. Thus, many holes are arranged in a limited area provided downstream of the heating element 4 in such a way as to restrain the strength of the diaphragm portion 13 from decreasing. Consequently, the heat resistance of the heat conduction path from the heating element 4 to the plate-like substrate 1 increases still more. Hence, the sensitivity of the sensor is prevented from being degraded still more.

Additionally, the holes are shaped into circular ones. Thus, stress is not concentrated on a part of the wall of each of the holes. Consequently, the breakage of the diaphragm portion 13 is prevented.

Incidentally, although the holes provided in the diaphragm portion 13 have circular, elliptical and oval shapes in the embodiments of the present invention, holes, each of which is shaped so that the cross section thereof have only obtuse corners, may be employed as those provided in the portion 13. For instance, polygonal holes, such as pentagonal or hexagonal holes, may be employed. Furthermore, such holes with only rounded corners may be employed Further, in the foregoing description of the embodiments, there has been described the flow rate detecting device which has the supporting film 2 and the protective coat 3 stacked on the top surface of the plate-like substrate 1 and which further has the diaphragm portion 13 constructed by completely removing a part of the plate-like substrate 1 from the back-surface side thereof so that a resultant space reaches the supporting film 2. However, the present invention may be applied to a flow rate detecting device having a diaphragm portion constructed by removing a part of the plate-like substrate 1 from the back surface side thereof so that a top-surface-side portion of the substrate 1 is left as a thin layer. Thus, similar advantageous effects are obtained if holes each having the same shape as that of a corresponding one of the holes of the aforementioned embodiments are provided in the same position as that of the corresponding one of the holes in the diaphragm portion of such a flow rate detecting device.

Further, in the foregoing description of the embodiments, there has been described the flow rate sensor of the type that uses the flow rate detecting device having the diaphragm portion 13 on which only the heating element 4 is formed, that detects a heating current for the heating element and that measures the flow rate and the flow velocity of a fluid according to the detected heating current. The present invention, however, may be applied to a flow rate sensor of the type that uses a flow rate detecting device in which a pair of temperature measuring elements are formed in a diaphragm portion in such a manner as to be placed at both sides of a heating element, that detects the difference in temperature between the temperature measuring elements and that measures the flow rate and the flow velocity of a fluid according to the detected difference in temperature between the temperature measuring elements. Thus, similar advantageous effects are obtained if holes each having the same shape as that of a corresponding one of the holes of the aforementioned embodiments are provided in the same position as that of the corresponding one of the holes in the diaphragm portion of the flow rate detecting device in which the pair of temperature measuring elements are formed in the diaphragm portion in such a manner as to be placed at both sides of the heating element.

The flow rate sensor of the present invention is constituted as described above, and thus has the following advantageous effects.

According to the present invention, there is provided a thermo-sensitive flow rate sensor having a flow rate detecting device that comprises a plate-like substrate, a part of which is removed so that a space is provided therein, a diaphragm portion formed like a thin layer above the aforesaid space in such a manner as to be integral with the aforesaid plate-like substrate, and a heating element constituted by a thermo-sensitive electrically resistant film formed on the aforesaid diaphragm portion, the aforesaid thermo-sensitive flow rate sensor being adapted to measure the flow rate of a fluid, which is to be measured, according to an amount of heat transferred to the aforesaid fluid from a part heated by energizing the aforesaid heating element, wherein a plurality of holes are provided in an outer peripheral portion of the heating element so as to penetrate the diaphragm portion, the holes being shaped in such a way as to have obtuse corner portions or to have substantially no corner portions. Thus, heat produced during the energization of the heating element is difficult to escape to the plate-like substrate. Further, the detecting sensitivity of the sensor is enhanced. Moreover, the concentration of stress on a part of each of the holes is difficult to occur. Consequently, the highly reliable thermo-sensitive flow rate sensor, whose diaphragm portion is hard to break, is obtained.

Furthermore, preferably, the aforesaid holes are shaped into nearly circular or oval ones. Thus, breakage of the diaphragm portion due to the concentration of stress on a part of each of the holes is prevented from occurring.

Additionally, preferably, at least a part of the plurality of holes are provided along the aforesaid heating element in a staggered arrangement. Thus, the strength of the diaphragm portion is restrained from decreasing. Consequently, heat produced by the heating element is effectively restrained from being conducted to the plate-like substrate.

Further, according to another aspect of the present invention, there is provided a thermo-sensitive flow rate sensor having a flow rate detecting device that comprises a plate-like substrate, a part of which is removed so that a space is provided therein, a diaphragm portion formed like a thin layer above the aforesaid space in such a manner as to be integral with the aforesaid plate-like substrate, and a heating element constituted by a thermo-sensitive electrically resistant film formed on the aforesaid diaphragm portion, the aforesaid thermo-sensitive flow rate sensor being adapted to measure the flow rate of a fluid, which is to be measured, according to an amount of heat transferred to the aforesaid fluid from a part heated by energizing the aforesaid heating element, wherein a plurality of holes are provided in an outer peripheral portion of the heating element which is other than a part located upstream of the heating element so as to penetrate the diaphragm portion. Thus, heat generated during the energization of the heating element is difficult to escape to the plate-like substrate. Moreover, the detecting sensitivity of the sensor is enhanced. Consequently, even in the case that the thermo-sensitive flow rate sensor is used over a long time period, variation in the characteristics due to dust depositing to the wall of each of the holes is small.

Additionally, preferably, at least a part of the plurality of holes are provided along the aforesaid heating element in a staggered arrangement. Thus, the strength of the diaphragm portion is restrained from decreasing. Consequently, heat produced by the heating element is effectively restrained from being conducted to the plate-like substrate.

Furthermore, according to still another aspect of the present invention, there is provided a thermo-sensitive flow rate sensor having a flow rate detecting device that comprises a plate-like substrate, a part of which is removed so that a space is provided therein, a diaphragm portion formed like a thin layer above the aforesaid space in such a manner as to be integral with the aforesaid plate-like substrate, and a heating element constituted by a thermo-sensitive electrically resistant film formed on the aforesaid diaphragm portion, the aforesaid thermo-sensitive flow rate sensor being adapted to measure the flow rate of a fluid, which is to be measured, according to an amount of heat transferred to the aforesaid fluid from a part heated by energizing the aforesaid heating element, wherein a plurality of holes are provided upstream and downstream of the heating element and along the heating element so as to penetrate the diaphragm portion, the holes provided upstream of the heating element being spaced further apart from the heating element than the holes provided downstream of the heating element. Thus, heat generated during the energization of the heating element is difficult to escape to the plate-like substrate. Moreover, the detecting sensitivity of the sensor is enhanced. Consequently, even in the case that the thermo-sensitive flow rate sensor is used over a long time period, variation in the characteristics due to dust depositing to the wall of each of the holes is small.

Further, preferably, the aforesaid holes are shaped into nearly circular or oval ones. Thus, breakage of the diaphragm portion due to the concentration of stress on a part of each of the holes is prevented from occurring.

Moreover, preferably, the thermo-sensitive flow rate sensor further comprises a temperature measuring element, which is spaced apart from the aforesaid diaphragm portion and formed on said plate-like substrate, for aforesaid diaphragm portion and formed on said plate-like substrate, for detecting a temperature of said fluid to be measured and a control circuit for controlling a heating current to be supplied to the aforesaid heating element so that a temperature of the aforesaid heating element is higher than a temperature of the aforesaid fluid by a certain number of degrees, thereby measuring a flow rate of the aforesaid fluid according to the heating current for the aforesaid heating element. Thus, the present invention realizes a thermo-sensitive flow rate sensor of a simple structure with high sensitivity and reliability.

Although the preferred embodiments of the present invention have been described above, it should be understood that the present invention is not limited thereto and that other modifications will be apparent to those skilled in the art without departing from the sprint of the invention. The scope of the present invention, therefore, should be determined solely by the appended claims.

What is claimed is:

1. A thermo-sensitive flow rate sensor for measuring a flow rate of a fluid, said thermo-sensitive flow rate sensor comprising:

a plate-like substrate having a central portion which is removed so that a cavity is provided therein;

a diaphragm portion formed by a thin layer disposed above said cavity in such a manner as to be integral with said plate-like substrate;

a heating element formed by a thermo-sensitive electrically resistant film disposed on said diaphragm portion;

a temperature measuring element, spaced apart from said diaphragm portion and formed on said plate-like substrate, for detecting a temperature of said fluid to be measured; and a control circuit for controlling a heating current to be supplied to said heating element so that a temperature of said heating element is higher than a temperature of said fluid by a predetermined number of degrees, thereby measuring a flow rate of said fluid according to the heating current for said heating element, wherein a plurality of holes are provided in an outer peripheral portion of said diaphragm portion which is other than a part located upstream of said heating element so as to penetrate said diaphragm portion.

2. The thermo-sensitive flow rate sensor according to claim 1, wherein each of said plurality of holes has a nearly circular or oval cross section.

3. The thermo-sensitive flow rate sensor according to claim 1, wherein at least a part of said plurality of holes are provided along said heating element in a staggered arrangement.

4. A thermo-sensitive flow rate sensor for measuring a flow rate of a fluid, said thermo-sensitive flow rate sensor comprising:

a plate-like substrate having a central portion which is removed so that a cavity is provided therein;

a diaphragm portion formed by a thin layer disposed above said cavity in such a manner as to be integral with said plate-like substrate;

a heating element formed by a thermo-sensitive electrically resistant film disposed on said diaphragm portion;

a temperature measuring element, spaced apart from said diaphragm portion and formed on said plate-like substrate, for detecting a temperature of said fluid to be measured; and a control circuit for controlling a heating current to be supplied to said heating element so that a temperature of said heating element is higher than a temperature of said fluid by a predetermined number of degrees, thereby measuring a flow rate of said fluid according to the heating current for said heating element, wherein a plurality of holes are provided in said diaphragm portion at locations upstream and downstream of said heating element and along said heating element so as to penetrate said diaphragm portion, said holes provided upstream of said heating element being spaced further apart from said heating element than said holes provided downstream of said heating element.

5. The heats-sensitive flow rate sensor according to claim 4, wherein each of said plurality of holes has a nearly circular or oval cross section.

* * * * *